United States Patent [19]

Gandre

[11] Patent Number: 5,754,809
[45] Date of Patent: May 19, 1998

[54] PERSPECTIVE WINDOWING TECHNIQUE FOR COMPUTER GRAPHICAL USER INTERFACE

[75] Inventor: Jerry D. Gandre, Austin, Tex.

[73] Assignee: Dell U.S.A., L.P., Austin, Tex.

[21] Appl. No.: 571,098

[22] Filed: Dec. 12, 1995

[51] Int. Cl.$^6$ ............................................. G06F 3/00
[52] U.S. Cl. ..................... 395/343; 395/340; 395/355
[58] Field of Search .................................. 395/340, 343, 395/355

[56] References Cited

U.S. PATENT DOCUMENTS

| | | | |
|---|---|---|---|
| 5,339,390 | 8/1994 | Robertson et al. | 395/342 |
| 5,377,317 | 12/1994 | Bates et al. | |
| 5,390,295 | 2/1995 | Bates et al. | |
| 5,412,776 | 5/1995 | Bloomfield et al. | |
| 5,425,141 | 6/1995 | Gedye | |

*Primary Examiner*—Raymond J. Bayerl
*Assistant Examiner*—A. Katbab
*Attorney, Agent, or Firm*—Haynes and Boone, L.L.P.

[57] ABSTRACT

System for implementing a perspective windowing technique for a computer GUI is disclosed. The perspective windowing system of the present invention displays each of a plurality of open but inactive, or "background," windows, with perspective depth with respect to one or more focal points, resulting in the background windows effectively taking up less space on the display of the PC. In contrast, a full frontal view of the active window is presented on the display to call the user's attention to the active window. When the user activates a new window, it swings forward about its full scale front edge, such that a full frontal view of the newly active window is presented on the display, and the previously active window swings back about an axis defined by its full front scale edge to be displayed in perspective with respect to the predefined focal point.

18 Claims, 2 Drawing Sheets

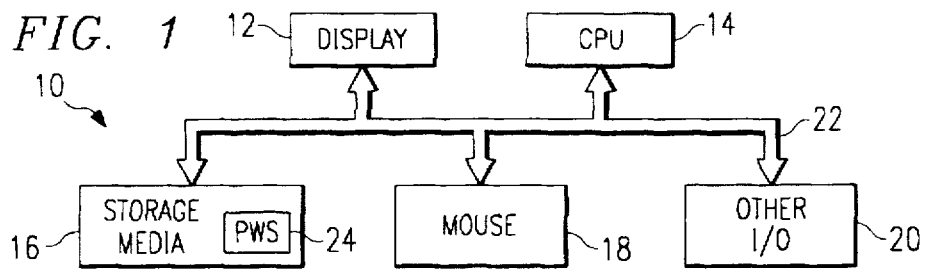
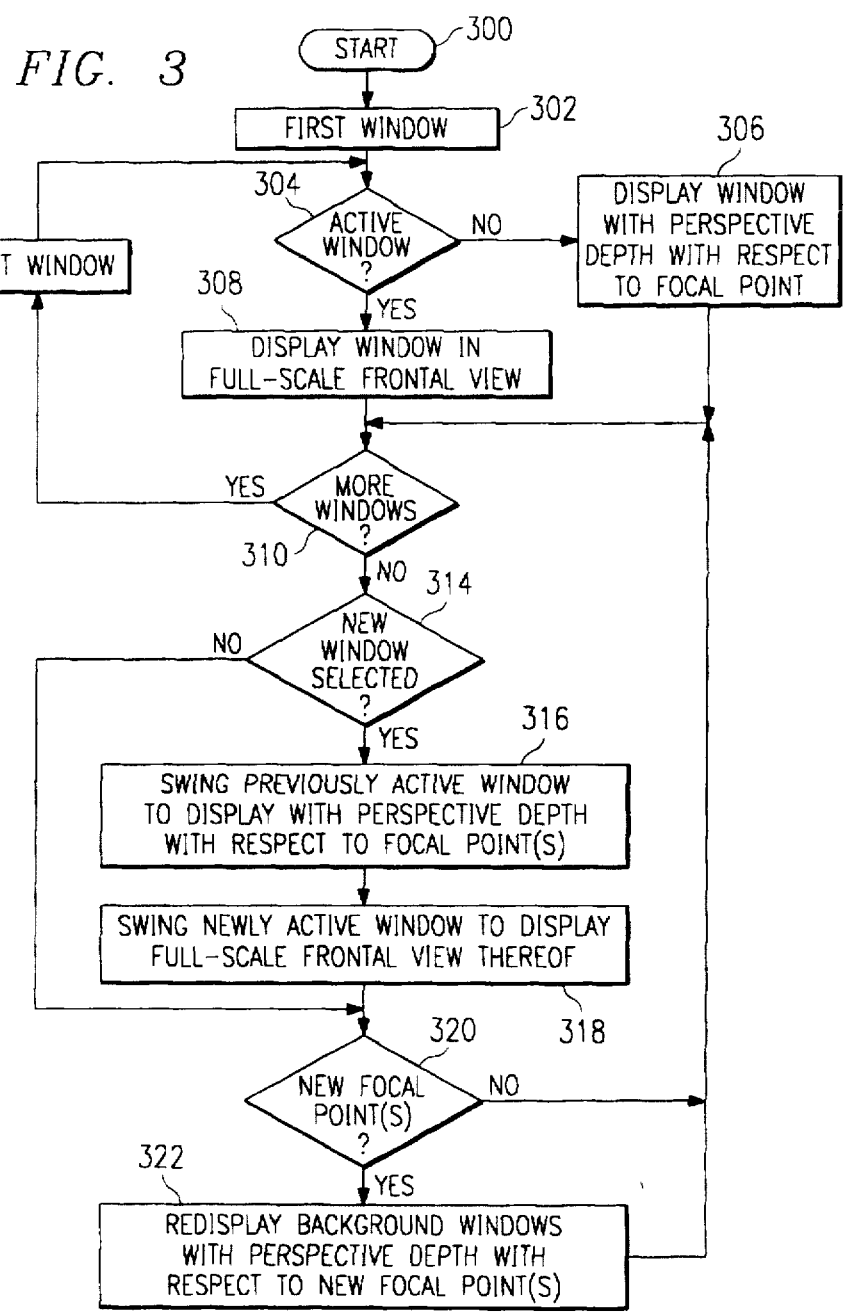

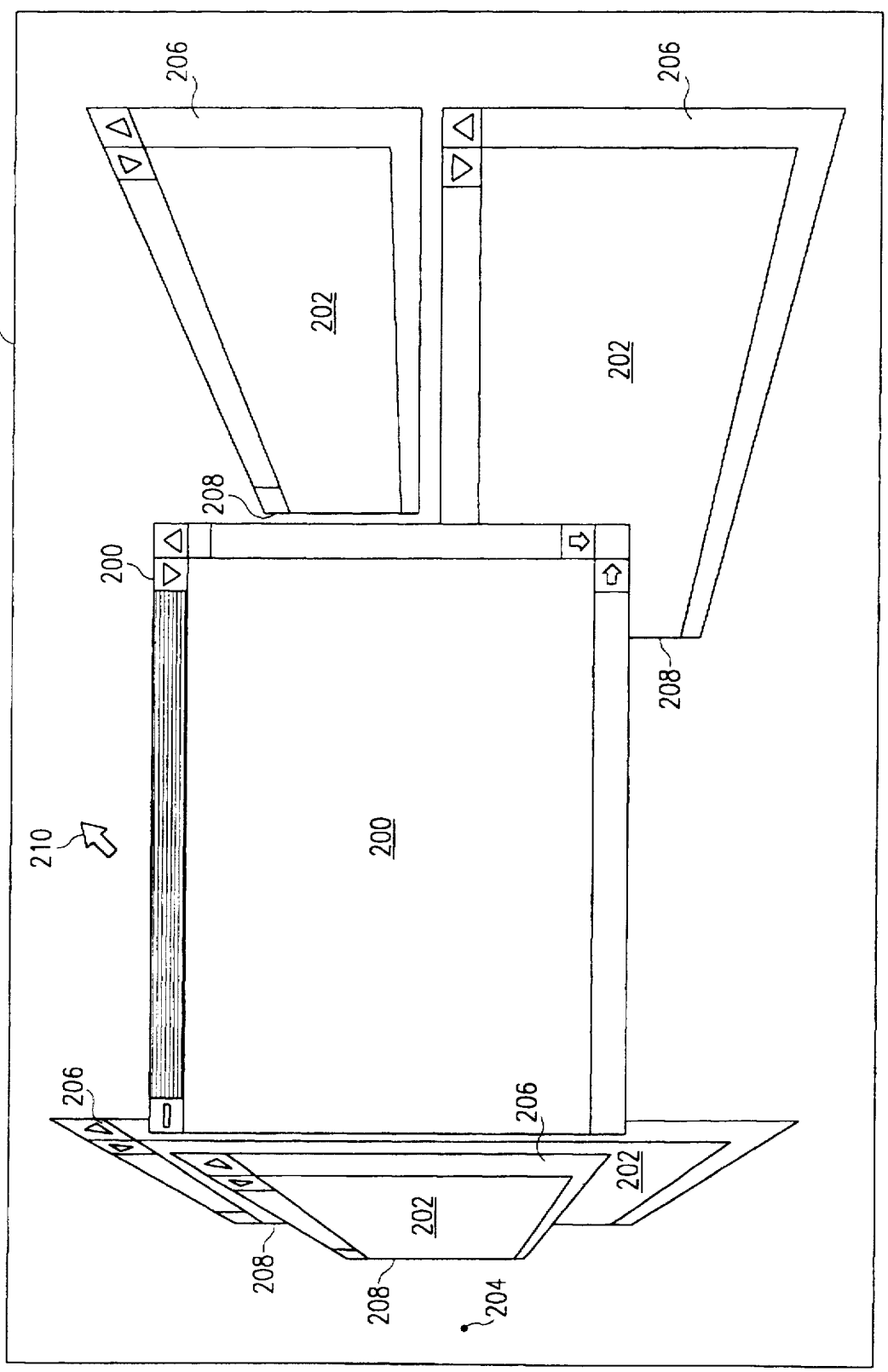

PERSPECTIVE WINDOWING TECHNIQUE FOR COMPUTER GRAPHICAL USER INTERFACE

TECHNICAL FIELD

The invention relates generally to graphical user interfaces ("GUIs") for personal computers and, more particularly, to a method of displaying active and inactive windows in such GUIs.

BACKGROUND OF THE INVENTION

Conventional computer systems, particularly personal computers ("PCs"), increasingly employ graphical user interfaces ("GUIs") that provide an intuitive interface to assist users in fully exploiting the functionality of the PC. One of the many advantages of GUIs is their ability to represent computer application programs, documents and data files as graphical display elements ("GDEs"), or icons, as opposed to text-based elements, that may be manipulated by a user, usually by means of a pointing device such as a mouse.

Another common feature of GUIs is that they enable a user to open a plurality of windows to be presented simultaneously on the display of the PC. In this manner, various applications may be executing and/or awaiting user input concurrently in each of the displayed windows. Moreover, a single application, such as a word processing application, can generate multiple windows. A mouse or other appropriate input device may be used to move among the various windows, enabling the user to perform a variety of different tasks without having to open and close each application between uses thereof.

Although GUIs clearly offer many advantages over conventional operating systems, such as DOS, the additional functionality provided by GUIs has created new problems for users. In particular, while GUIs support the presentation on the PC display of an almost unlimited number of windows, it does not necessarily follow that an unlimited number of windows can be presented in an effective manner. On the contrary, because windows may overlap one another, it is likely that many, if not most, of the open windows will be either partially or completely obscured by other windows. This problem can occur with as few as two open windows and is exacerbated with each additional window that is opened. Typically, the active window will appear at the forefront of the display, with all other open windows being obscured by the active window. Alternatively, the windows may be horizontally and/or vertically "tiled," such that only a proportional amount of each open window is visible on the display. Clearly, when windows are displayed in this manner, the more windows that are open, the less of each a user will be able to see. In addition, when a portion of all open windows are visible on the display, it may be difficult for the user to determine which is the active window.

Some GUIs maintain a list of open windows for display as a window list. However, as more and more windows are opened, even these lists become somewhat unwieldy. Use of such window lists is further impaired by the lack of an intuitive approach to organizing the lists. Often, entries in a window list are set forth in alphabetical order by window title; alternatively, they may be set forth in the order that they were opened. Neither of these approaches necessarily makes it easy for a user to determine which window he wishes to open. Moreover, it may not be immediately clear from a window lists which window is currently active.

Therefore, what is needed is an effective way to present multiple open windows to a user such that all windows are visible on the display, while rendering the identity of the active window obvious.

SUMMARY OF THE INVENTION

The present invention, accordingly, provides a system for implementing a perspective windowing technique for a computer GUI that overcomes or reduces disadvantages and limitations associated with prior methods and systems. In a departure from the art, the perspective windowing system of the present invention displays each of a plurality of open but inactive, or "background," windows, with perspective depth with respect to one or more focal points, resulting in the background windows effectively taking up less space on the display of the PC.

In a preferred embodiment, while background windows are displayed with perspective, the windows are still readily recognizable because the size of any information displayed therein is effectively full scale at the "front" edge and progressively smaller moving away from that edge toward the "rear" edge. Hence, the user should still be able to identify the information displayed in a background window and use it as a reference to the active window. In contrast, a full frontal view of the active window is presented on the display, thereby rendering it obvious to a user which is the active window.

In operation, when the user clicks on a background window, it "swings" forward about its full scale front edge, such that a full frontal view of the newly active window is presented on the display, and the previously active window "swings" back about an axis defined by its full front scale edge to be displayed in perspective with respect to the predefined focal point. In this manner, the full scale edge of the previously active window is presented in the same location on the display at all times and the window effectively tapers in a direction perpendicular to that edge as the window moves to the perspective view.

In one aspect of the invention, the user may select the location of the focal point for the background windows. This could be accomplished by a user's clicking and dragging the focal point to a desired location on the display. In addition, the user may disable the perspective display feature on one or more of the open windows, such that when those windows are not active, they are not displayed with perspective.

In another aspect of the invention, the user may specify more than one focal point for various windows, thereby causing the background windows to take up less space on the display and add more flexibility to user control.

In yet another aspect, the user may control the speed at which the windows transition between active and inactive states.

A technical advantage achieved with the invention is that it enables a user to determine at a glance which of a plurality of open windows is the active window.

Another technical advantage achieved with the invention is that it enables the display of all open windows in an effective manner, such that the information in those windows is identifiable but the windows themselves do not take up a great deal of room on the display.

BRIEF DESCRIPTION OF THE DRAWINGS

FIG. 1 illustrates a personal computer ("PC") for implementing the perspective windowing system of the present invention.

FIG. 2 illustrates the perspective windowing system of the present invention as displayed on the display of the PC of FIG. 1.

FIG. 3 is a flowchart of the operation of the perspective windowing system of the present invention.

DESCRIPTION OF THE PREFERRED EMBODIMENTS

FIG. 1 is a block diagram of a personal computer ("PC") 10 suitable for implementing the perspective windowing technique of the present invention. As shown in FIG. 1, the system 10 comprises a display 12, a central processing unit (CPU) 14, storage media 16, a mouse 18 and other input/output ("I/O") devices 20 interconnected in a conventional manner via a bus 22. As used herein, the term "storage media" is intended to comprise any number and combination of electronic storage devices, for example, RAM, ROM, and mass storage devices and drives. Instructions for implementing a perspective windowing system ("PWS") 24 of the present invention are stored in storage media 16 for execution by the CPU 14. It should be understood that the PWS 24 may be stored in a memory device, on a hard disk drive, or on a floppy disk inserted into the floppy disk drive of the storage media 16.

FIG. 2 illustrates an exemplary display generated by the PWS 24 of the present invention. In particular, a plurality of open windows, including an active window 200 and several background windows 202, are presented on the display 12. As shown in FIG. 2, a full frontal view of the active window 200 is presented on the display 12. In contrast, each of the background windows 202 are displayed with perspective depth with respect to a focal point 204 such that the front edges 206 of the windows 202 are displayed in full scale. Each of the windows 206 is progressively tapered in a direction perpendicular to its front edge 206 toward the focal point 204 such that its rear edge 208 is proportionally smaller than the front edge 206 thereof. Accordingly, the perspective effect is accomplished by simply tapering the display of a window 206, making it proportionally smaller proceeding from the front edge 206 toward the focal point 204 to the rear edge 208 thereof.

FIG. 3 is a flowchart of the operation of the PWS 24. Execution begins in step 300. In step 302, the first window is referenced and a determination is made in step 304 whether the window is active. If not, meaning that the window is a background window, execution proceeds to step 306, in which the window is displayed with perspective depth with respect to the focal point 204 (FIG. 2). If the window is the active window, execution proceeds to step 308, in which a full scale frontal view of the window is presented on the display 12 (FIG. 1). Upon completion of step 306 or 308, execution proceeds to step 310, in which a determination is made whether there are more open windows to be displayed. If so, execution proceeds to step 312, in which the next window is referenced, and steps 304 through 312 are repeated until all of the open windows are displayed on the display 12.

If in step 310, there are no more open windows that remain to be displayed, execution proceeds to step 314, in which a determination is made whether the user has selected a new active window. If so, execution proceeds to step 316, in which the previously active window swings back around its front edge to be displayed with perspective depth with respect to the focal point(s) 204. In step 318, the newly active window swings forward along its front edge such that a full-scale frontal view thereof is presented on the display 12. Execution then proceeds to step 320. If in step 314, a new window has not been selected, execution proceeds directly to step 320.

In step 320, a determination is made whether the user has selected a new focal point(s), as described below. If so, execution proceeds to step 322, in which each of the current background windows are redisplayed with perspective depth with respect to the new focal point location(s). Execution then returns to step 310. If in step 320 a new focal point(s) has not been selected, execution returns directly to step 310.

In operation, when the user selects one of the background windows 206, for example, using the mouse 18 (FIG. 1) to position a mouse pointer 210 over the selected window and then clicking the left mouse button, the selected window, thus activated, "swings" forward about its front edge 206, such that a full frontal view of the newly active window is presented on the display 12, and the previously active window "swings" back about an axis defined by its full scale edge to be displayed with perspective depth with respect to its focal point 204. In a preferred embodiment, one edge of each of the windows 200, 202, is presented in the same location on the display 12 at all times and the window effectively tapers in a direction perpendicular to that edge as a window moves from an active to a background view.

In one aspect of the invention, the user may change the location of the focal point 204 by simply positioning the mouse pointer 210 over the focal point 204, and then clicking and dragging the focal point 204 to the desired location on the display 12. In addition, the user may disable the perspective display feature for one or more of the windows 200, 202, such that even when those windows are not active, they are not displayed with perspective depth. This may be accomplished by the user's accessing a dialog box (not shown) designated for that purpose and making the appropriate selections therewith.

In another aspect of the invention, the user may specify more than one focal point for various windows, thereby causing the background windows 206 to take up less space on the display and add more flexibility to user control. In yet another aspect, the user may control the speed at which the windows transition between active and inactive states. Again, these features may be implemented via one or more designated dialog boxes (not shown).

It is understood that the present invention can take many forms and embodiments, the embodiments shown herein are intended to illustrate rather than limit, the invention, it being understood that variations may be made without departing from the spirit of the scope of the invention. For example, the PWS 24 may be implemented in connection with any number of different types of GUI-type operating environments, including, but not limited to, the various versions of Microsoft Windows, the Macintosh operating system, and Unix-based Pro-Engineer, available from Parametric Technology Corporation, Waltham, Mass.

Although illustrative embodiments of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention.

What is claimed is:

1. A method for efficiently displaying a plurality of windows on a display of a computer, the method comprising the steps of:

displaying a full scale frontal view of an active one of said windows on said display; and displaying each background one of said windows on said display with perspective depth with respect to a focal point such that information displayed in said background one of said windows is full scale at a front edge of said background one of said windows and progressively smaller moving away from said front edge toward a rear edge of said background one of said windows, said display of said background one of said windows being responsive to user selection of said focal point.

2. The method of claim 1 further comprising, responsive to user selection of one of said background windows, displaying a full-scale frontal view of said selected one of said background windows on said display and displaying said active one of said windows with perspective depth with respect to said focal point.

3. The method of claim 1 further comprising, responsive to user selection of a new focal point, redisplaying said background windows with perspective depth with respect to said new focal point.

4. The method of claim 1 further comprising selecting a focal point for each of said windows.

5. The method of claim 1 further comprising selecting more than one focal point for said windows.

6. The method of claim 1 further comprising specifying a speed of transition of said windows between a background state and an active state.

7. A computer program for enabling the efficient display of a plurality of windows on a display of a computer, the computer program stored on a computer-readable medium and comprising:

instructions for displaying a full scale frontal view of an active one of said windows on said display; and instructions for displaying each background and one of said windows on said display with perspective depth with respect to a focal point such that information displayed in a background one of said windows is full scale at a front edge of said background one of said windows and progressively smaller moving away from said front edge toward a rear edge of said background one of said windows, said display of said background one of said windows being responsive to user selection of said focal point.

8. The computer program of claim 7 further comprising instructions executed in response to user selection of one of said background windows for displaying a full-scale frontal view of said selected one of said background windows on said display and displaying said active one of said windows with perspective depth with respect to said focal point.

9. The computer program of claim 7 further comprising instructions executed in response to user selection of a new focal point for redisplaying said background windows with perspective depth with respect to said new focal point.

10. The computer program of claim 7 further comprising instructions for enabling a user to select a focal point for each of said windows.

11. The computer program of claim 7 further comprising instructions for enabling a user to select more than one focal point for said windows.

12. The computer program of claim 7 further comprising instructions for enabling a user to specify a speed of transition of said windows between a background state and an active state.

13. Apparatus for enabling the efficient display of a plurality of windows on a display of a computer, the apparatus comprising:

means for displaying a full scale frontal view of an active one of said windows on said display; and means for displaying each background one of said windows on said display with perspective depth with respect to a focal point such that information displayed in a background one of said windows is full scale at a front edge of said background one of said windows and progressively smaller moving away from said front edge toward a rear edge of said background one of said windows, sad display of said background one of said windows being responsive to user selection of said focal point.

14. The apparatus of claim 13 further comprising means responsive to user selection of one of said background windows for displaying a full-scale frontal view of said selected one of said background windows on said display and for displaying said active one of said windows with perspective depth with respect to said focal point.

15. The apparatus of claim 13 further comprising means responsive to user selection of a new focal point for redisplaying said background windows with perspective depth with respect to said new focal point.

16. The apparatus of claim 13 further comprising means for enabling user-selection of a focal point for each of said windows.

17. The apparatus of claim 13 further comprising means for enabling user-selection of more than one focal point for said windows.

18. The apparatus of claim 13 further comprising means for enabling user-specification of a speed of transition of said windows between a background state and an active state.

* * * * *